US012743750B2

(12) United States Patent
Sun

(10) Patent No.: US 12,743,750 B2
(45) Date of Patent: Sep. 22, 2026

(54) BLIND IMAGE DENOISING METHOD, ELECTRONIC DEVICE, AND STORAGE MEDIUM

(71) Applicant: ZHEJIANG UNIVIEW TECHNOLOGIES CO., LTD., Hangzhou (CN)

(72) Inventor: Yue Sun, Hangzhou (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 274 days.

(21) Appl. No.: 18/579,149

(22) PCT Filed: Dec. 8, 2021

(86) PCT No.: PCT/CN2021/136268
§ 371 (c)(1),
(2) Date: Jan. 12, 2024

(87) PCT Pub. No.: WO2023/284236
PCT Pub. Date: Jan. 19, 2023

(65) Prior Publication Data

US 2024/0323548 A1 Sep. 26, 2024

(30) Foreign Application Priority Data

Jul. 15, 2021 (CN) ......................... 202110799034.1

(51) Int. Cl.
*G06T 5/70* (2024.01)
*G06T 5/60* (2024.01)
(Continued)

(52) U.S. Cl.
CPC .................. *G06T 5/70* (2024.01); *G06T 5/60* (2024.01); *G06T 7/80* (2017.01); *H04N 17/002* (2013.01);
(Continued)

(58) Field of Classification Search
CPC .... G06T 5/70; G06T 5/60; G06T 7/80; G06T 2207/20081; G06T 2207/20084;
(Continued)

(56) References Cited

U.S. PATENT DOCUMENTS 8,255,063 B2 8/2012 Doerr
2004/0027469 A1* 2/2004 Tsuruoka ............ H04N 25/633 348/E5.079
(Continued)

FOREIGN PATENT DOCUMENTS

CN 103973990 A 8/2014
CN 104021533 A 9/2014
(Continued)

OTHER PUBLICATIONS

Extended European Search Report for Application No. 21950008.9, dated May 23, 2025, 11 pages.
(Continued)

*Primary Examiner* — Atiba O Fitzpatrick
(74) *Attorney, Agent, or Firm* — MASCHOFF BRENNAN

(57) ABSTRACT

Provided are a blind image denoising method, an electronic device, and a storage medium. The blind image denoising method includes the following: A target noise parameter of a to-be-denoised image is determined according to an image noise calibration result obtained by pre-performing an image noise calibration on an image acquisition device of the to-be-denoised image; a preliminary filtering process is performed on the to-be-denoised image so that a preliminary filtered image of the to-be-denoised image is obtained; a noise level estimation result of the to-be-denoised image is determined according to the target noise parameter and the preliminary filtered image; and a final denoising process is performed on the to-be-denoised image according to the
(Continued)

noise level estimation result so that a final blind denoising result of the to-be-denoised image is obtained.

15 Claims, 2 Drawing Sheets

(51) Int. Cl.
*G06T 7/80* (2017.01)
*H04N 17/00* (2006.01)
*H04N 23/71* (2023.01)
*H04N 23/73* (2023.01)
*H04N 23/81* (2023.01)

(52) U.S. Cl.
CPC ............. *H04N 23/71* (2023.01); *H04N 23/73* (2023.01); *H04N 23/81* (2023.01)

(58) Field of Classification Search
CPC ............ G06T 5/92; G06T 2207/20024; H04N 17/002; H04N 23/71; H04N 23/73; H04N 23/81; G06N 3/0464
See application file for complete search history.

(56) References Cited

U.S. PATENT DOCUMENTS

2006/0050157 A1* 3/2006 Tsuruoka ................. H04N 5/21 348/E5.079
2010/0246689 A1* 9/2010 Filippini .............. H04N 19/124 375/E7.2
2012/0075505 A1 3/2012 Van Beek
2018/0025474 A1 1/2018 Mei et al.
2021/0104021 A1* 4/2021 Sohn ...................... G06N 3/045
2021/0327031 A1* 10/2021 Xie ........................... G06T 5/70
2022/0148130 A1* 5/2022 Tang ........................ G06N 3/09
2022/0375039 A1* 11/2022 Soh ........................... G06T 5/70
2024/0386527 A1* 11/2024 Zhang ....................... G06T 5/70

FOREIGN PATENT DOCUMENTS

CN 104504700 A 4/2015
CN 109285129 A 1/2019
CN 110766632 A 2/2020
CN 110807812 A 2/2020
CN 111340713 A 6/2020
CN 111489303 A * 8/2020 ............. G06N 3/045
CN 112291447 A * 1/2021 ............. H04N 23/81
CN 112513936 A * 3/2021 ............... G06T 5/10
CN 112529854 3/2021
KR 100759517 B1 9/2007

OTHER PUBLICATIONS

International Search Report in Application No. PCT/CN2021/136268, dated Apr. 13, 2022, 4 pages, including translation.
Chinese Office Action for Application No. 202110799034.1, dated Nov. 27, 2025, 18 pages including translation.

* cited by examiner

BLIND IMAGE DENOISING METHOD, ELECTRONIC DEVICE, AND STORAGE MEDIUM

CROSS REFERENCE TO RELATED APPLICATIONS

This is a National Stage Application, filed under 35 U.S.C. 371, of International Patent Application No. PCT/CN2021/136268, filed on Dec. 8, 2021, which claims priority to Chinese patent application No. 202110799034.1 filed with the China National Intellectual Property Administration (CNIPA) on Jul. 15, 2021, the disclosures of which are incorporated herein by reference in their entireties.

TECHNICAL FIELD

Embodiments of the present application relate to the field of image processing technology, for example, a blind image denoising method, an electronic device, and a storage medium.

BACKGROUND

In the process of obtaining an image through an image acquisition device, due to physical constraints of the image acquisition device and limitations of external light environment, noise is inevitably present in the acquired image, which in turn affects the imaging quality. Therefore, image acquisition devices in the related art all use image denoising technology to improve the imaging quality of the devices. However, due to component complexity and source diversity of real image noise as well as the differences in real noise models of various image acquisition devices, it is difficult to remove real image noise. The current requirement for image denoising is to achieve good denoising results when input images with different noise levels are processed, that is, to achieve blind denoising.

In the related art, the blind denoising methods generally adopt a scheme based on convolutional neural networks (CNNs), and the scheme may include two steps. In the first step, a CNN subnetwork is used to perform noise level estimation on an input to-be-denoised image, and a noise level map of the input to-be-denoised image is obtained; and in the second step, the noise level map is merged with the to-be-denoised image and then input into another CNN subnetwork for processing to obtain a blind denoising result of the to-be-denoised image. This manner of combining the noise level estimation with CNN denoising enables the entire model to have a good blind denoising capability. However, the overall complexity of the model in this method is too high, which requires the deployment of two CNNs simultaneously, and high computing power of the hardware platform, thereby increasing the difficulty of deploying the model on platforms with limited computing power such as front-end image acquisition devices.

SUMMARY

Embodiments of the present application provide a blind image denoising method and apparatus, an electronic device, and a storage medium to implement noise level estimation through the method of combining an image noise calibration with filtering, so that the overall complexity of the blind denoising method is reduced.

An embodiment of the present application provides a blind image denoising method. The method includes steps described below.

A target noise parameter of a to-be-denoised image is determined according to an image noise calibration result obtained by pre-performing an image noise calibration on an image acquisition device of the to-be-denoised image.

A preliminary filtering process is performed on the to-be-denoised image so that a preliminary filtered image of the to-be-denoised image is obtained.

A noise level estimation result of the to-be-denoised image is determined according to the target noise parameter and the preliminary filtered image.

A final denoising process is performed on the to-be-denoised image according to the noise level estimation result so that a final blind denoising result of the to-be-denoised image is obtained.

An embodiment of the present application further provides a blind image denoising apparatus. The apparatus includes an image noise parameter determination module, an image preliminary filtering module, a noise level estimation module and a blind denoising module.

The image noise parameter determination module is configured to determine a target noise parameter of a to-be-denoised image according to an image noise calibration result obtained by pre-performing an image noise calibration on an image acquisition device of the to-be-denoised image.

The image preliminary filtering module is configured to perform a preliminary filtering process on the to-be-denoised image to obtain a preliminary filtered image of the to-be-denoised image.

The noise level estimation module is configured to determine a noise level estimation result of the to-be-denoised image according to the target noise parameter and the preliminary filtered image.

The blind denoising module is configured to perform a final denoising process on the to-be-denoised image according to the noise level estimation result to obtain a final blind denoising result of the to-be-denoised image.

An embodiment of the present application further provides an electronic device. The electronic device includes one or more processors and a storage apparatus configured to store one or more programs.

When the one or more programs are executed by the one or more processors, the one or more processors are caused to implement the blind image denoising method according to any embodiment of the present application.

An embodiment of the present application further provides a computer-readable storage medium storing a computer program which, when executed by a processor, implements the blind image denoising method according to any embodiment of the present application.

DETAILED DESCRIPTION

Figure 1:
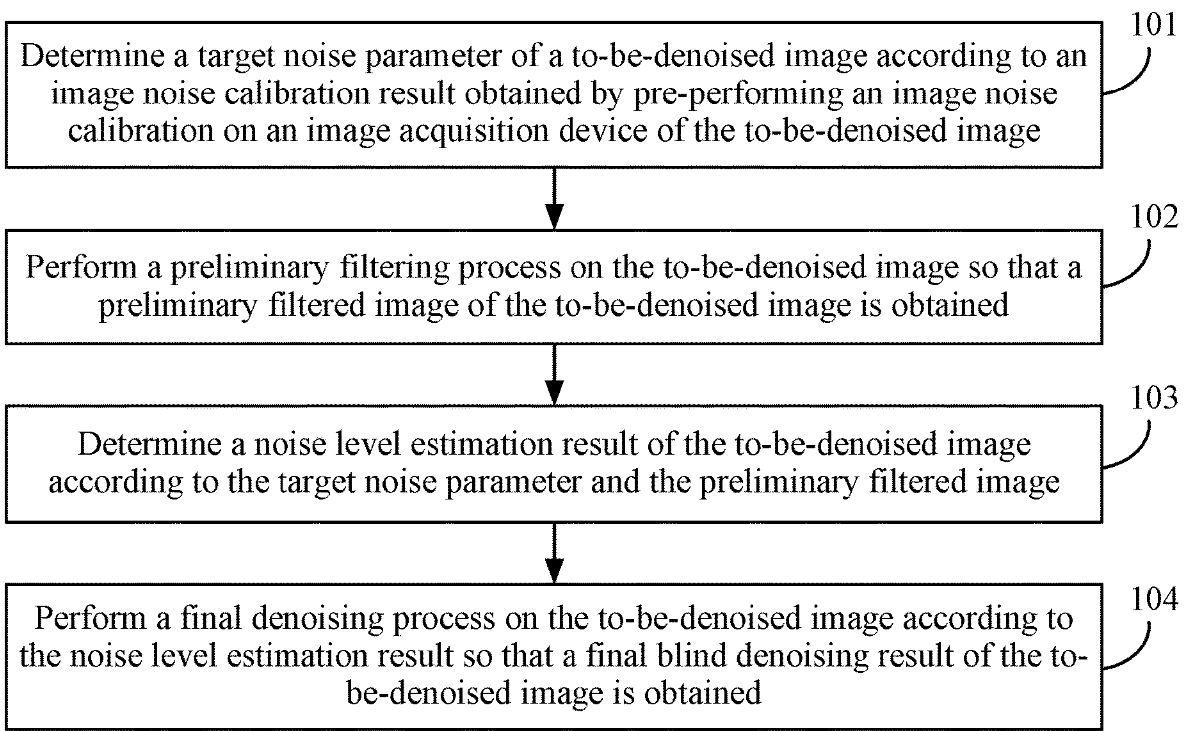
FIG. 1 is a flowchart of a blind image denoising method according to an embodiment of the present application.

The present application is further described in detail hereinafter in conjunction with the drawings and embodiments. It is to be understood that specific embodiments described herein are intended to illustrate the present application and not to limit the present application. Additionally, it is to be noted that for ease of description, only part, not all, of structures related to the present application are illustrated in the drawings.

FIG. 1 is a flowchart of a blind image denoising method according to an embodiment of the present application. The embodiment is applicable to the case of performing blind denoising on a to-be-denoised image. The method may be executed by a blind image denoising apparatus. The apparatus may be implemented by software and/or hardware and configured in an electronic device, such as a background server or other devices having communication and calculation capabilities. As shown in FIG. 1, the method includes steps described below.

In step 101, a target noise parameter of a to-be-denoised image is determined according to an image noise calibration result obtained by pre-performing an image noise calibration on an image acquisition device of the to-be-denoised image.

Blind denoising refers to a denoising algorithm that can effectively denoise input images of different noise levels. In the embodiments of the present application, the manner of combining the noise level estimation with the denoising algorithm is still used for ensuring the blind denoising capability. When a noise level estimation result of the to-be-denoised image is determined, a manner of combining the image noise calibration with a traditional filter is used for determining a target noise parameter of the to-be-denoised image in the image noise calibration. The target noise parameter is used for characterizing a noise model brought by the image acquisition device to the acquired image. Different types of image acquisition devices have different sensors, so noise models also have differences. Therefore, in the embodiments of the present application, the image noise calibration is pre-performed on different types of image acquisition devices, and noise models corresponding to the image acquisition devices are obtained to characterize the noise of the acquired images. In the embodiments of the present application, it is only necessary to perform pre-calibration on each type of image acquisition device once. After the calibration is completed, the noise model for the image acquisition device of the type is determined, and no repeated calibration is required.

For example, at least one type of image acquisition device for image acquisition is predetermined, and one image noise calibration is performed on the at least one type of image acquisition device so that a corresponding image noise calibration result is obtained. The image noise calibration result expresses the degree to which the image acquisition device affects the noise level in the image during image acquisition. Exemplarily, the image acquisition device may have an adjustable device parameter during image acquisition, and thus images acquired under different device parameters have different image noise levels. Therefore, the image noise calibration result obtained through the image noise calibration performed on the image acquisition device reflects the impact of different device parameters on the noise in the acquired images. On this basis, the device parameter of the image acquisition device is determined for the time when the to-be-denoised image is acquired, and the target noise parameter of the to-be-denoised image is determined according to the device parameter and the image noise calibration result.

For example, the image noise calibration result obtained by pre-preforming the image noise calibration on the image acquisition device of the to-be-denoised image includes a mapping relationship between different device parameters and noise parameters, a target device parameter of the to-be-denoised image is determined at the same time, and the target noise parameter mapped by the target device parameter is determined according to the mapping relationship.

In an embodiment, the image noise calibration result includes at least one candidate exposure gain value and an associated candidate noise parameter.

Accordingly, step 101 includes steps described below.

A target exposure gain value of the image acquisition device when the image acquisition device acquires the to-be-denoised image is determined.

The target noise parameter associated with the target exposure gain value is determined according to the associated candidate noise parameter based on a relationship between the target exposure gain value and the candidate exposure gain value.

The candidate exposure gain value refers to a predetermined acquisition parameter value of the image acquisition device. The specific number and numerical values of candidate exposure gain values may be predetermined according to device attributes of the image acquisition device, which are not limited herein. Exemplarily, the candidate exposure gain value is predetermined as a group of exposer gain values $\{ISO_j;\ j=1, \ldots s\}$, that is, s candidate exposure gain values are set, and one image noise calibration is performed for each candidate exposure gain value so that a candidate noise parameter for each candidate exposure gain value is obtained, that is, the image noise calibration result includes a mapping relationship between candidate exposure gain values and candidate noise parameters, where $1 \le j \le s$.

When the target noise parameter of the to-be-denoised image is determined, firstly, the exposure gain value of the image acquisition device when the image acquisition device acquires the to-be-denoised image is determined as the target exposure gain value. Due to the limited number of candidate exposure gain values, it is not possible to exhaustively list all exposure gain values of the image acquisition device. Therefore, if the target noise parameter is not among the candidate exposure gain values, an interpolation calculation manner is used for determining the target noise parameter associated with the target exposure gain value according to the associated candidate noise parameter based on the relationship between the target exposure gain value and the candidate exposure gain value.

Exemplarily, the image noise calibration result includes a group of candidate exposure gain values $\{ISO_j;\ j=1, \ldots s\}$, and candidate noise parameters $\{a_{j,i};\ j=1, \ldots s, \text{ and } i=0, \ldots n\}$ associated with each candidate exposure gain value, that is, candidate noise parameters associated with each candidate exposure gain value includes (n+1) parameters. Assuming that the target exposure gain value is $ISO_x$, if $ISO_x$ is one of $\{ISO_j;\ j=1, \ldots s\}$, the target noise parameter may be directly determined from $\{a_{j,i};\ j=1, \ldots s, \text{ and } i=0, \ldots n\}$; and if $ISO_x$ is not from $\{ISO_j;\ j=1, \ldots s\}$, a linear interpolation manner is used for accurately solve the target noise parameters $\{a_{x,i};\ i=0, \ldots n\}$ associated with the current target exposure gain value $ISO_x$. For example, the target noise parameters $\{a_{x,i};\ i=0, \ldots n\}$ are determined according to the following formula:

$$a_{x,i} = \begin{cases} a_{1,i}, & ISO_x < ISO_1 \\ \dfrac{(ISO_{j+1} - ISO_x)a_{j,i} + (ISO_x - ISO_j)a_{j+1,j}}{ISO_{j+1} - ISO_j}, & ISO_j \le ISO_x < ISO_{j+1} \\ a_{s,i}, & ISO_x \ge ISO_s \end{cases}.$$

It is to be noted that when the preceding linear interpolation manner is used for solving the target noise parameters $\{a_{x,i}; i=0, \ldots n\}$ associated with the current target exposure gain value $ISO_x$, values of $\{ISO_j; j=1, \ldots s\}$ are monotonically increasing.

In an embodiment, the step in which the image noise calibration is pre-performed on the image acquisition device of the to-be-denoised image includes the step described below.

Data of at least two to-be-calibrated images is acquired from the same shooting scene through the image acquisition device for each candidate exposure gain value of candidate exposure gain values, where the candidate exposure gain values include at least one candidate exposure gain value.

A candidate noise parameter of each candidate exposure gain value is determined separately according to the data of at least two to-be-calibrated images associated with each candidate exposure gain value, and the image noise calibration result of the image acquisition device is determined according to at least one candidate exposure gain value and the associated candidate noise parameter.

When the image noise calibration is pre-performed, each candidate exposure gain value needs to be calibrated, that is, the candidate noise parameter for each candidate exposure gain value is acquired.

For example, a group of candidate exposure gain values $\{ISO_j; j=1, \ldots s\}$ are predetermined according to the image acquisition device, and multiple images shot by the image acquisition device for each candidate exposure gain value are acquired as to-be-calibrated image data. Since the multiple images are acquired for the same exposure gain value and in the same shooting scene, a noise level for the current exposure gain value can be determined through differences between the multiple images, and then the corresponding candidate noise parameter is determined. To ensure that the data of the calibrated images obtained by shooting includes information of multiple levels of luminance, the shooting scene needs to include different luminance information. Exemplarily, the shooting scene may be a standard grey card.

Exemplarily, in a laboratory scene with controllable ambient luminance, the camera picture focuses on the standard grey card to ensure clear focus of the picture, and the picture remains static during the calibration process. The candidate exposure gain values are set to {100, 400, 1600, 6400, 25600, 102400} respectively; for each candidate exposure gain value, the camera shutter or ambient illuminance is manually adjusted to ensure moderate luminance of the picture. While the luminance of the picture remains unchanged, image data of m frames are consecutively collected as the to-be-calibrated image data. The noise level of the image is determined according to the image data of m frames for each candidate exposure gain value. For example, a relationship between pixel point luminance and differences of each pixel in the m frames is determined, and then the candidate noise parameter of the candidate exposure gain value is determined. Finally, all candidate exposure gain values and candidate noise parameters associated with the candidate exposure gain values compose the image noise calibration result.

Exemplarily, if only one candidate exposure gain value is included, that is, the image noise calibration result includes only one candidate exposure gain value and the candidate noise parameter, when the target noise parameter of the to-be-denoised image is determined, the candidate noise parameter may be directly determined as the target noise parameter. Alternatively, the target noise parameter is determined according to a relationship between the candidate exposure gain value and the target exposure gain value, for example, the candidate noise parameter is calculated proportionally according to a proportional relationship between the candidate exposure gain value and the target exposure gain value, so as to obtain the target noise parameter.

In an embodiment, the step in which the candidate noise parameter of each candidate exposure gain value is determined separately according to the data of at least two to-be-calibrated images associated with each candidate exposure gain value includes steps described below.

An image noise level expression of the image acquisition device is determined as follows:

$$V(x) = \sum_{i=0}^{n} a_i x^i,$$

where x denotes a target pixel luminance value of a target pixel point, V(x) denotes a noise variance for characterizing a noise level of the target pixel point, n denotes a polynomial series, and a; is a to-be-calibrated noise parameter.

An average calibrated image is determined according to a pixel average value of the data of at least two to-be-calibrated images associated with the candidate exposure gain value on each pixel point.

A variance calibrated image is determined according to pixel value variance of the data of at least two to-be-calibrated images associated with the candidate exposure gain value on each pixel point.

At least (n+1) pairs of pixels with different values are determined from the average calibrated image and the variance calibrated image, a value of the to-be-calibrated noise parameter is determined according to the at least (n+1) pairs of pixels based on the image noise level expression, and the value of the to-be-calibrated noise parameter is used as the candidate noise parameter of the candidate exposure gain value.

The image noise level expression is used for characterizing a functional relationship between an image noise variance (a quantified value of the noise level) and pixel luminance. It is found that the image noise acquired by the image acquisition device generally follows a Poisson-Gaussian distribution, and the functional relationship between the noise variance and the pixel luminance may be represented by the following linear function:

$$V(x) = k \cdot x + \sigma^2.$$

The first term on the right side of the formula is a Poisson noise term, the noise variance of the Poisson noise term is directly proportional to the pixel luminance; the second term is a Gaussian noise term; and parameters k and $\sigma^2$ determine the noise level of the image and are related to the exposure gain value of the image acquisition device. However, the preceding model has certain biases, for example, a high-order nonlinear relationship exists between the noise variance and the pixel luminance. To more accurately reflect the actual noise model, the embodiments of the present application adopt a polynomial function to describe the relationship between the noise variance and the pixel luminance:

$$V(x) = \sum_{i=0}^{n} a_i x^i.$$

The series n of the polynomial function may be set according to actual noise characteristics of the image acquisition device and user requirements. Exemplarily, n equal to 2 is a reasonable value, parameters $\{a_i; i=0, \ldots n\}$ are the to-be-calibrated noise parameter, which are related to the exposure gain value of the image acquisition device, V(x) denotes the noise variance, and the noise level of each pixel point in the image is characterized by quantifying the noise variance of the pixel point.

On the basis of the preceding example, the to-be-calibrated image data of m frames for each candidate exposure gain are determined, an average value of the image data of consecutive m frames on each pixel is calculated so that an average calibrated image I is obtained; at the same time, a variance of the image data of consecutive m frames on each pixel is calculated so that a variance calibrated image V is obtained. According to the preceding image noise level expression, it can be seen that for any pixel value $x_p$ in the average calibrated image I, the pixel value $V(x_p)$ of a position corresponding to the pixel value $x_p$ in the variance calibrated image V should satisfy the functional relationship in the image noise level expression, that is, $$V(x_p) = \sum_{i=0}^{n} a_i x_p^i.$$

Since the number of to-be-calibrated noise parameters which need to be determined in the image noise level expression is n+1, at least (n+1) pairs of $(x_p - V(x_p))$ pixels with different pixel values need to be determined from the average calibrated image and the variance calibrated image. The specifically selected pixel values may be determined according to the actual situation and are not limited herein. Finally, the values of $(x_p - V(x_p))$ pixel pairs are substituted into the image noise level expression, and (n+1) unknowns are solved so that the values of the to-be-calibrated noise parameters are obtained. Candidate noise parameters for the remaining candidate exposure gain values are sequentially calculated in this method.

When the values of the to-be-calibrated noise parameters are determined according to the pixel pairs, the least squares method may be used. Exemplarily, it is set that t pairs of $(x_p - V(x_p))$ pixels with different pixel values are selected from the images I and V, where t satisfies that $t \geq n+1$, and then the image noise level expression is solved by the following formulas: setting $$A = \begin{bmatrix} a_n \\ a_{n-1} \\ \ldots \\ a_0 \end{bmatrix}, X = \begin{bmatrix} x_1^n & x_1^{n-1} & \ldots & x_1 & 1 \\ x_2^n & x_2^{n-1} & \ldots & x_2 & 1 \\ \ldots & \ldots & \ldots & \ldots & \ldots \\ x_t^n & x_t^{n-1} & \ldots & x_t & 1 \end{bmatrix}, \text{ and}$$

$$V = \begin{bmatrix} V(x_1) \\ V(x_2) \\ \ldots \\ V(x_t) \end{bmatrix}, \text{ then } A = (X^T X)^{-1} X^T V.$$

The obtained image noise calibration result includes a group of candidate exposure gain values $\{ISO_j; j=1, \ldots s\}$, and candidate noise parameters $\{a_{j,i}; j=1, \ldots s, \text{ and } i=0, \ldots n\}$ for each candidate exposure gain value, where a noise parameter $a_{j,i}$ denotes an i-th order noise parameter for a j-th candidate exposure gain value.

In step 102, a preliminary filtering process is performed on the to-be-denoised image so that a preliminary filtered image of the to-be-denoised image is obtained.

Performing the preliminary filtering process on the to-be-denoised image is to smooth the image and eliminate the interference of noise on the calculation of noise level estimation. Exemplarily, on the basis of the preceding examples, the image noise level expression of the image acquisition device is a functional relationship between pixel luminance values and pixel variances. Therefore, to determine the pixel variance of the to-be-denoised image, it is necessary to determine the pixel luminance value, that is, to eliminate interference factors of the noise in the pixel values. This step does not have high requirements for image denoising effect, so that a simple and efficient conventional image filtering method may be used. The preliminary filtering method here may be Gaussian filtering, mean filtering, median filtering, bilateral filtering, or guided filtering, which is not limited herein.

In an embodiment, the preliminary filtering process uses Gaussian filtering, mean filtering, median filtering, bilateral filtering, or guided filtering.

For example, to better preserve detail features in the filtered image, the preliminary filtering process may use an edge-preserving filter such as a bilateral filter or a guided filter to improve the quality of the subsequent denoised image.

In step 103, a noise level estimation result of the to-be-denoised image is determined according to the target noise parameter and the preliminary filtered image.

The target noise parameter characterizes a relationship between the noise level in an image and the pixel value of the image. Therefore, the noise level estimation result of the to-be-denoised image may be determined according to the target noise parameter and the preliminary filtered image in which the noise impact is preliminarily eliminated.

In an embodiment, step 103 includes steps described below.

The image noise level expression of the image acquisition device is determined as follows:

$$V_p = \sum_{i=0}^{n} a_{x,i} x_p^i,$$

where $x_p$ denotes a pixel value of a target pixel point in the preliminary filtered image, $V_p$ denotes a noise level of a pixel point which is in the to-be-denoised image and is associated with the target pixel point in the preliminary filtered image, n denotes a polynomial series, and $a_{x,i}$ is the target noise parameter of the to-be-denoised image. The preliminary filtered image has the same image size as the to-be-denoised image.

A noise level map is obtained by determining a noise level of each pixel point in the preliminary filtered image according to the target noise parameter and a pixel value of each pixel point in the preliminary filtered image based on the image noise level expression, and the noise level map is used as the noise level estimation result of the to-be-denoised image.

The noise level map denotes an estimated value of the noise variance of each pixel in the input to-be-denoised image. It can be known from the preceding that the form of the polynomial function is used for describing the relationship between the noise variance and the pixel luminance, that is, the image noise level expression of the image acquisition device is determined. After the target noise parameter is determined, it represents that $\{a_{x,i}; i=0, \ldots n\}$ in the image noise level expression is determined; after the preliminary filtered image is determined, $x_p$ in the image noise level expression is determined; and the polynomial series n is predetermined when the candidate noise parameter is determined.

As the preliminary filtered image and the to-be-denoised image have the same image size, the pixel value of any pixel point $x_p$ in the preliminary filtered image is input into the determined image noise level expression, and the obtained noise level $V_p$ is the pixel value at the same position of $x_p$ in the noise level map. Various pixel values in the preliminary filtered image are traversed sequentially to obtain the noise level map. The noise level map denotes the noise level estimation result of the to-be-denoised image.

In step 104, a final denoising process is performed on the to-be-denoised image according to the noise level estimation result so that a final blind denoising result of the to-be-denoised image is obtained.

Blind denoising is performed on the image according to the noise level estimation result of the to-be-denoised image, so that targeted denoising according to actual noise situation at multiple positions in the image is achieved, and thus the denoising effect is improved.

For example, the local denoising intensity of the to-be-denoised image is determined according to the noise level estimation result, the final denoising process is performed on the to-be-denoised image according to the local denoising intensity, and the final blind denoising result of the to-be-denoised image is obtained.

In an embodiment, step 104 includes steps described below.

The noise level map is stitched with the to-be-denoised image in a channel dimension so that a merged image is obtained.

A denoising process is performed on the merged image based on a pre-trained image noise removal network so that the final blind denoising result of the to-be-denoised image is obtained.

The pre-trained image noise removal network is a CNN, which is obtained by training through a pre-acquired dataset. The specific network structure of the image noise removal network is not limited. For example, a CNN denoising network model using a frame such as convolutional networks for biomedical image segmentation (U-Net) and feed-forward denoising CNN (DnCNN) may be used, and the implementation is not repeated.

For example, the to-be-denoised image and the noise level map are merged and input into the preset image noise removal network for denoising processing. In this manner, when the image noise removal network performs the denoising process on the to-be-denoised image by using noise level distribution information of the to-be-denoised image, a better blind denoising effect can be achieved. The image size of the final blind denoising result of the to-be-denoised is the same as that of the input to-be-denoised image.

To avoid losing image information, the merging of the to-be-denoised image and the noise level map is achieved through stitching in the channel dimension. Exemplarily, assuming that the width of the to-be-denoised image is w, the height of the to-be-denoised image is h, and the number of channels of the to-be-denoised image is c; the size of the noise level map is the same as the size of the to-be-denoised image, so that the width, the height and the number of channels of the noise level map are also w, h and c respectively. The two images are stitched in the channel dimension, that is, the images are stacked in the channel dimension, and thus the width, the height and the number of channels of the obtained merged image are w, h and 2*c respectively.

In the embodiments of the present application, the image noise calibration and the traditional filtering are combined to achieve the noise level estimation of the image, and the efficiency of image noise level estimation can be improved. In this manner, the overall complexity of the blind denoising method is reduced while the blind denoising effect is maintained, and thus the deployment difficulty of the blind denoising method on the platforms with limited computing power such as front-end image acquisition devices is reduced.

Figure 2:
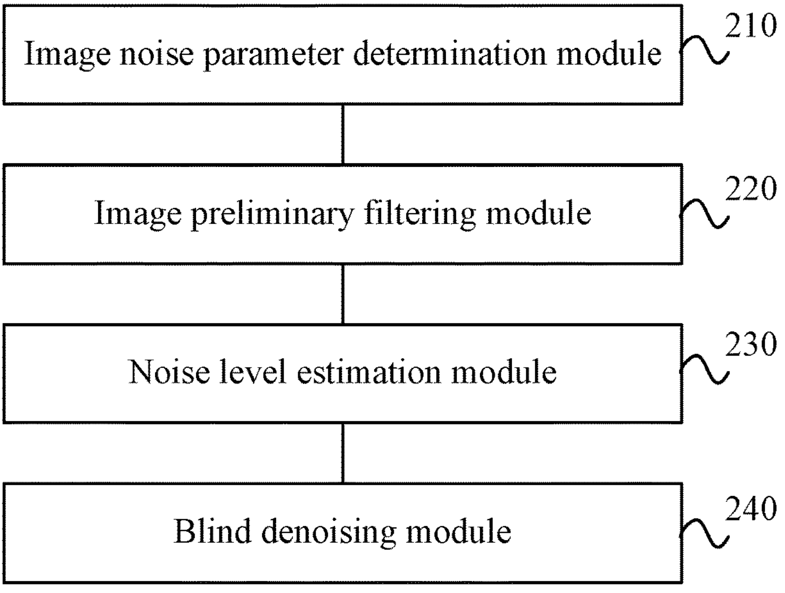
FIG. 2 is a structural diagram of a blind image denoising apparatus according to an embodiment of the present application.

FIG. 2 is a structural diagram of a blind image denoising apparatus according to an embodiment of the present application. The embodiment is applicable to the case of performing blind denoising on a to-be-denoised image. As shown in FIG. 2, the apparatus includes an image noise parameter determination module 210, an image preliminary filtering module 220, a noise level estimation module 230 and a blind denoising module 240.

The image noise parameter determination module 210 is configured to determine a target noise parameter of a to-be-denoised image according to an image noise calibration result obtained by pre-performing an image noise calibration on an image acquisition device of the to-be-denoised image.

The image preliminary filtering module 220 is configured to perform a preliminary filtering process on the to-be-denoised image to obtain a preliminary filtered image of the to-be-denoised image.

The noise level estimation module 230 is configured to determine a noise level estimation result of the to-be-denoised image according to the target noise parameter and the preliminary filtered image.

The blind denoising module 240 is configured to perform a final denoising process on the to-be-denoised image according to the noise level estimation result to obtain a final blind denoising result of the to-be-denoised image.

In the embodiments of the present application, the image noise calibration and the traditional filtering are combined to achieve the noise level estimation of the image, and the efficiency of image noise level estimation is improved. In this manner, the overall complexity of the blind denoising method is reduced while the blind denoising effect is maintained, and thus the deployment difficulty of the blind denoising method on the platforms with limited computing power such as front-end image acquisition devices is reduced.

For example, the apparatus includes an image noise calibration module. The image noise calibration module includes a calibration data acquisition unit and a noise parameter determination unit.

The calibration data acquisition unit is configured to acquire, for each candidate exposure gain value, data of at least two to-be-calibrated images from the same shooting scene through the image acquisition device, where there is at least one candidate exposure gain value.

The noise parameter determination unit is configured to determine a candidate noise parameter of each candidate exposure gain value according to the data of at least two to-be-calibrated images associated with each candidate exposure gain value, and determine the image noise calibration result of the image acquisition device according to the at least one candidate exposure gain value and the associated candidate noise parameter.

For example, the noise parameter determination unit is configured to:

determine an image noise level expression of the image acquisition device as follows:

$$V(x) = \sum_{i=0}^{n} a_i x^i,$$

where x denotes a target pixel luminance value of a target pixel point, V(x) denotes a noise variance for characterizing a noise level of the target pixel point, n denotes a polynomial series, and $a_i$ is a to-be-calibrated noise parameter;

determine an average calibrated image according to a pixel average value of the data of at least two to-be-calibrated images associated with the candidate exposure gain value on each pixel point;

determine a variance calibrated image according to a pixel value variance of the data of at least two to-be-calibrated images associated with the candidate exposure gain value on each pixel point; and determine at least (n+1) pairs of pixels with different values from the average calibrated image and the variance calibrated image, determine a value of the to-be-calibrated noise parameter according to the at least (n+1) pairs of pixels based on the image noise level expression, and use the value of the to-be-calibrated noise parameter is used as the candidate noise parameter of the candidate exposure gain value.

For example, the image noise calibration result includes at least one candidate exposure gain value and an associated candidate noise parameter.

Accordingly, the image noise parameter determination module is configured to:

determine a target exposure gain value of the image acquisition device when the image acquisition device acquires the to-be-denoised image; and determine the target noise parameter associated with the target exposure gain value according to the associated candidate noise parameter based on a relationship between the target exposure gain value and the candidate exposure gain value.

For example, the noise level estimation module is configured to:

determine an image noise level expression of the image acquisition device as follows:

$$V_p = \sum_{i=0}^{n} a_{x,i} x_p^i,$$

where $x_p$ denotes a pixel value of a target pixel point in the preliminary filtered image, $V_p$ denotes a noise level of a pixel point associated with the target pixel point in the preliminary filtered image, n denotes a polynomial series, and $a_{x,i}$ is the target noise parameter of the to-be-denoised image, where the preliminary filtered image has the same image size as the to-be-denoised image; and determine a noise level of each pixel point based on the image noise level expression and according to the target noise parameter and a pixel value of each pixel point in the preliminary filtered image so that a noise level map is obtained and used as the noise level estimation result of the to-be-denoised image.

For example, the blind denoising module is configured to:

stitch the noise level map with the to-be-denoised image in a channel dimension so that a merged image is obtained; and perform a denoising process on the merged image based on a pre-trained image noise removal network so that the final blind denoising result of the to-be-denoised image is obtained.

For example, the preliminary filtering process uses methods such as Gaussian filtering, mean filtering, median filtering, bilateral filtering or guided filtering.

The blind image denoising apparatus provided in the embodiments of the present application can perform the blind image denoising method provided in any embodiment of the present application and has functional modules for and effects of performing the blind image denoising method.

Figure 3:
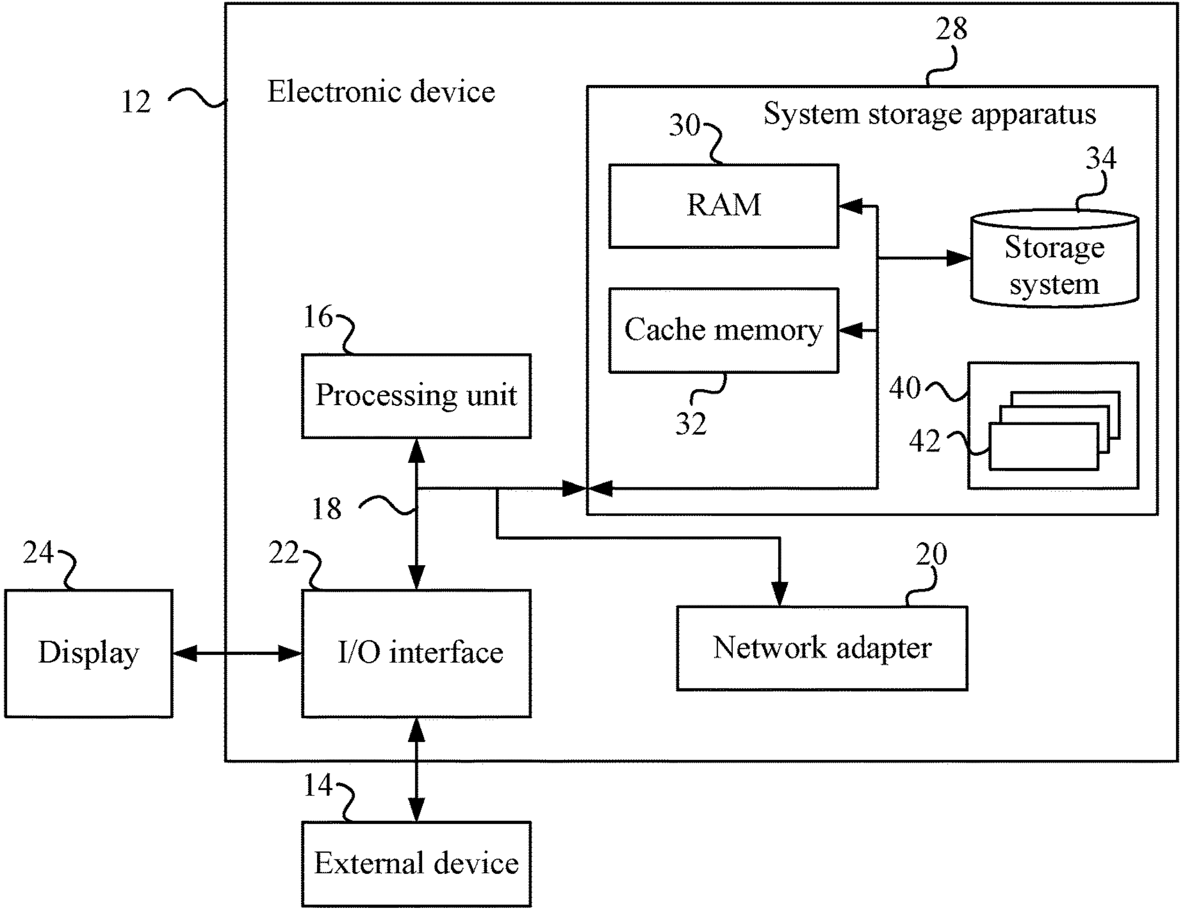
FIG. 3 is a structural diagram of an electronic device according to an embodiment of the present application.

FIG. 3 is a structural diagram of an electronic device according to an embodiment of the present application. FIG. 3 illustrates a block diagram of an example electronic device 12 applicable to implementing embodiments of the present application. The electronic device 12 shown in FIG. 3 is merely an example and is not intended to limit the function and use scope of the embodiments of the present application.

As shown in FIG. 3, the electronic device 12 may be in the form of a general-purpose computer device. Components of the electronic device 12 may include, but are not limited to, one or more processors or processing units 16, a system storage apparatus 28 and a bus 18 for connecting different system components (including the system storage apparatus 28 and the one or more processing units 16).

The bus 18 represents one or more of several types of bus structures, including a storage apparatus bus or a storage apparatus controller, a peripheral bus, an accelerated graphics port, a processor, or a local bus using any of various bus structures. For example, these architectures include, but are not limited to, an Industry Standard Architecture (ISA) bus, a Micro Channel Architecture (MAC) bus, an enhanced ISA bus, a Video Electronics Standards Association (VESA) local bus and a Peripheral Component Interconnect (PCI) bus.

The electronic device 12 typically includes multiple computer system-readable media. These media may be available media that can be accessed by the electronic device 12. These media include volatile and non-volatile media, and removable and non-removable media.

The system storage apparatus 28 may include a computer system-readable medium in the form of a volatile storage apparatus, such as a random-access memory (RAM) 30 and/or a cache memory 32. The electronic device 12 may further include other removable/non-removable and volatile/non-volatile computer system storage media. Merely exemplarily, a storage system 34 may be configured to read from and write to non-removable and non-volatile magnetic media (not shown in FIG. 3, commonly referred to as a "hard disk drive"). Although not shown in FIG. 3, it is feasible to provide a magnetic disk drive for reading from and writing to a removable non-volatile magnetic disk (for example, a "floppy disk"), and an optical disc drive for reading from and writing to a removable non-volatile optical disc, such as a compact disc read-only memory (CD-ROM), a digital video disc-read only memory (DVD-ROM) or other optical media. In these cases, each drive may be connected to the bus 18 through one or more data media interfaces. The storage apparatus 28 may include at least one program product having a group of program modules (for example, at least one program module). Such program modules are configured to perform functions of multiple embodiments of the present application.

A program/utility 42 having a group of program modules 44 (at least one program module 42) may be stored, for example, in the storage apparatus 28. Such program modules 42 include, but are not limited to, an operating system, one or more application programs, other program modules and program data. Each or some combination of these examples may include implementation of a network environment. The program modules 42 generally execute the functions and/or methods in the embodiments of the present application.

The electronic device 12 may also communicate with one or more external devices 14 (for example, a keyboard, a pointing device and a display 24). The electronic device 12 may also communicate with one or more devices that enable a user to interact with the device 12, and/or with any device (for example, a network card or a modem) that enables the device 12 to communicate with one or more other computing devices. The communication may be performed through an input/output (I/O) interface 22. Moreover, the electronic device 12 may communicate with one or more networks (such as a local area network (LAN), a wide area network (WAN) and/or a public network, for example, the Internet) through a network adaptor 20. As shown in FIG. 3, the network adaptor 20 communicates with other modules of the electronic device 12 via the bus 18. It is to be understood that although not shown in FIG. 3, other hardware and/or software modules may be used in conjunction with the electronic device 12. The other hardware and/or software modules include, but are not limited to, microcode, a device driver, a redundant processing unit, an external disk drive array, a redundant arrays of independent disks (RAID) system, a tape drive, a data backup storage system and the like.

The processing unit 16 executes various functional applications and data processing by running programs stored in the system storage apparatus 28, for example, so as to implement the blind image denoising method provided in the embodiments of the present application. The method includes the following:

A target noise parameter of a to-be-denoised image is determined according to an image noise calibration result obtained by pre-performing an image noise calibration on an image acquisition device of the to-be-denoised image.

A preliminary filtering process is performed on the to-be-denoised image so that a preliminary filtered image of the to-be-denoised image is obtained.

A noise level estimation result of the to-be-denoised image is determined according to the target noise parameter and the preliminary filtered image.

A final denoising process is performed on the to-be-denoised image according to the noise level estimation result so that a final blind denoising result of the to-be-denoised image is obtained.

An embodiment of the present application further provides a computer-readable storage medium storing a computer program which, when executed by a processor, implements the blind image denoising method provided in the embodiments of the present application, and the method includes the following:

A target noise parameter of a to-be-denoised image is determined according to an image noise calibration result obtained by pre-performing an image noise calibration on an image acquisition device of the to-be-denoised image.

A preliminary filtering process is performed on the to-be-denoised image so that a preliminary filtered image of the to-be-denoised image is obtained.

A noise level estimation result of the to-be-denoised image is determined according to the target noise parameter and the preliminary filtered image.

A final denoising process is performed on the to-be-denoised image according to the noise level estimation result so that a final blind denoising result of the to-be-denoised image is obtained.

A computer storage medium in the embodiments of the present application may adopt any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof. More specific examples (a non-exhaustive list) of the computer-readable storage medium include: an electrical connection having one or more wires, a portable computer magnetic disk, a hard disk, a random-access memory (RAM), a read-only memory (ROM), an erasable programmable read-only memory (EPROM or a flash memory), an optical fiber, a portable compact disc read-only memory (CD-ROM), an optical storage device, a magnetic storage device or any suitable combination thereof. In this document, the computer-readable storage medium may be any tangible medium including or storing a program. The program may be used by or used in conjunction with an instruction execution system, apparatus or device. The computer-readable storage medium may be a non-transitory computer-readable storage medium.

The computer-readable signal medium may include a data signal propagated in a baseband or as part of a carrier. Computer-readable program codes are carried in the data signal. The data signal propagated in this manner may be in multiple forms and includes, but is not limited to, an electromagnetic signal, an optical signal or any suitable combination thereof. The computer-readable signal medium may be any computer-readable medium other than the computer-readable storage medium. The computer-readable medium may send, propagate, or transmit a program used by or used in conjunction with an instruction execution system, apparatus or device.

Program codes included in the computer-readable medium may be transmitted via any suitable medium. The medium includes, but is not limited to, a wireless medium, a wire, an optical cable, a radio frequency (RF) or the like, or any appropriate combination thereof.

Computer program codes for performing the operations of the present application may be written in one or more programming languages or a combination thereof, the programming languages including object-oriented programming languages such as Java, Smalltalk and C++ and further including conventional procedural programming languages such as C programming language or similar programming languages. The program codes may be executed entirely on a user computer, executed partly on a user computer, executed as a stand-alone software package, executed partly on a user computer and partly on a remote computer, or executed entirely on a remote computer or a server. In the case related to the remote computer, the remote computer may be connected to the user computer via any kind of network including a local area network (LAN) or a wide area network (WAN), or may be connected to an external computer (for example, via the Internet through an Internet service provider).

What is claimed is:

1. A blind image denoising method, comprising:

determining a target noise parameter of a to-be-denoised image according to an image noise calibration result obtained by pre-performing an image noise calibration on an image acquisition device of the to-be-denoised image;

performing a preliminary filtering process on the to-be-denoised image to obtain a preliminary filtered image of the to-be-denoised image;

determining a noise level estimation result of the to-be-denoised image according to the target noise parameter and the preliminary filtered image; and performing a final denoising process on the to-be-denoised image according to the noise level estimation result to obtain a final blind denoising result of the to-be-denoised image;

wherein pre-performing the image noise calibration on the image acquisition device of the to-be-denoised image comprises:

determining at least one candidate exposure gain value according to a device attribute of the image acquisition device;

for each of the at least one candidate exposure gain value, acquiring data of at least two to-be-calibrated images from a same shooting scene through the image acquisition device; and for each of the at least one candidate exposure gain value, determining a candidate noise parameter of a candidate exposure gain value according to the data of the at least two to-be-calibrated images associated with the candidate exposure gain value, and determining the image noise calibration result of the image acquisition device according to each of the at least one candidate exposure gain value and the candidate noise parameter associated with each of the at least one candidate exposure gain value;

wherein for each of the at least one candidate exposure gain value, determining the candidate noise parameter of the candidate exposure gain value according to the data of the at least two to-be-calibrated images associated with the candidate exposure gain value comprises:

determining an image noise level expression of the image acquisition device as follows:

$$V(x)=\sum_{i=0}^{n}a_i x^i,$$

wherein x denotes a target pixel luminance value of a target pixel point, V(x) denotes a noise variance for characterizing a noise level of the target pixel point, n denotes a polynomial series, and $a_j$ is a to-be-calibrated noise parameter for characterizing a to-be-calibrated i-th order noise parameter under each of the at least one candidate exposure gain value, wherein n is a positive integer, n≥1, and 0≤i≤n;

determining an average calibrated image according to a pixel average value of the data of the at least two to-be-calibrated images associated with each of the at least one candidate exposure gain value on each pixel point;

determining a variance calibrated image according to a pixel value variance of the data of the at least two to-be-calibrated images associated with each of the at least one candidate exposure gain value on each pixel point; and determining at least (n+1) pairs of pixels with different values from the average calibrated image and the variance calibrated image, determining, according to the at least (n+1) pairs of pixels, a value of the to-be-calibrated noise parameter based on the image noise level expression, and using the value of the to-be-calibrated noise parameter as the candidate noise parameter for each of the at least one candidate exposure gain value.

2. The blind image denoising method according to claim 1, wherein the image noise calibration result comprises at least one candidate exposure gain value and a candidate noise parameter associated with each of the at least one candidate exposure gain value; and determining the target noise parameter of the to-be-denoised image according to the image noise calibration result obtained by pre-performing the image noise calibration on the image acquisition device of the to-be-denoised image comprises:

determining a target exposure gain value of the image acquisition device when the image acquisition device acquires the to-be-denoised image; and determining, based on a relationship between the target exposure gain value and the at least one candidate exposure gain value, the target noise parameter associated with the target exposure gain value according to the candidate noise parameter associated with each of the at least one candidate exposure gain value.

3. The blind image denoising method according to claim 1, wherein determining the noise level estimation result of the to-be-denoised image according to the target noise parameter and the preliminary filtered image comprises:

determining an image noise level expression of the image acquisition device as follows:

$$V_p=\sum_{i=0}^{n}a_{x,i}x_p^i,$$

wherein $x_p$ denotes a pixel value of a target pixel point in the preliminary filtered image, $V_p$ denotes a noise level of a pixel point which is in the to-be-denoised image and is associated with the target pixel point in the preliminary filtered image, n denotes a polynomial series, and $a_{x,i}$ is the target noise parameter of the to-be-denoised image, wherein the preliminary filtered image has a same image size as the to-be-denoised image, n is a positive integer, n≥1, and 0≤i≤n; and determining, based on the image noise level expression, a noise level of each pixel point in the preliminary filtered image according to the target noise parameter and a pixel value of each pixel point in the preliminary filtered image to obtain a noise level map, and using the noise level map as the noise level estimation result of the to-be-denoised image.

4. The blind image denoising method according to claim 3, wherein performing the final denoising process on the to-be-denoised image according to the noise level estimation result to obtain the final blind denoising result of the to-be-denoised image comprises:

stitching the noise level map with the to-be-denoised image in a channel dimension to obtain a merged image; and performing, based on a pre-trained image noise removal network, a denoising process on the merged image to obtain the final blind denoising result of the to-be-denoised image.

5. The blind image denoising method according to claim 1, wherein the preliminary filtering process uses Gaussian filtering, mean filtering, median filtering, bilateral filtering or guided filtering.

6. An electronic device, comprising:

at least one processor; and a storage apparatus configured to store at least one program;

wherein the at least one program is executed by the at least one processor to cause the at least one processor to implement the following:

determining a target noise parameter of a to-be-denoised image according to an image noise calibration result obtained by pre-performing an image noise calibration on an image acquisition device of the to-be-denoised image;

performing a preliminary filtering process on the to-be-denoised image to obtain a preliminary filtered image of the to-be-denoised image;

determining a noise level estimation result of the to-be-denoised image according to the target noise parameter and the preliminary filtered image; and performing a final denoising process on the to-be-denoised image according to the noise level estimation result to obtain a final blind denoising result of the to-be-denoised image;

wherein the at least one processor is caused to implement pre-performing the image noise calibration on the image acquisition device of the to-be-denoised image by:

determining at least one candidate exposure gain value according to a device attribute of the image acquisition device;

for each of the at least one candidate exposure gain value, acquiring data of at least two to-be-calibrated images from a same shooting scene through the image acquisition device, wherein at least one candidate exposure gain value is provided; and for each of the at least one candidate exposure gain value, determining a candidate noise parameter of a candidate exposure gain value according to the data of the at least two to-be-calibrated images associated with the candidate exposure gain value, and determining the image noise calibration result of the image acquisition device according to each of the at least one candidate exposure gain value and the candidate noise parameter associated with each of the at least one candidate exposure gain value;

wherein the at least one processor is caused to implement, for each of the at least one candidate exposure gain value, determining the candidate noise parameter of the candidate exposure gain value according to the data of the at least two to-be-calibrated images associated with the candidate exposure gain value by:

determining an image noise level expression of the image acquisition device as follows:

$$V(x) = \sum_{i=0}^{n} a_i x^i,$$

wherein x denotes a target pixel luminance value of a target pixel point, V(x) denotes a noise variance for characterizing a noise level of the target pixel point, n denotes a polynomial series, and ais a to-be-calibrated noise parameter for characterizing a to-be-calibrated i-th order noise parameter under each of the at least one candidate exposure gain value, wherein n is a positive integer, $n \geq 1$, and $0 \leq i \leq n$;

determining an average calibrated image according to a pixel average value of the data of the at least two to-be-calibrated images associated with each of the at least one candidate exposure gain value on each pixel point;

determining a variance calibrated image according to a pixel value variance of the data of the at least two to-be-calibrated images associated with each of the at least one candidate exposure gain value on each pixel point; and determining at least (n+1) pairs of pixels with different values from the average calibrated image and the variance calibrated image, determining, according to the at least (n+1) pairs of pixels, a value of the to-be-calibrated noise parameter based on the image noise level expression, and using the value of the to-be-calibrated noise parameter as the candidate noise parameter for each of the at least one candidate exposure gain value.

7. A non-transitory computer-readable storage medium storing a computer program which, when executed by a processor, implements the following:

determining a target noise parameter of a to-be-denoised image according to an image noise calibration result obtained by pre-performing an image noise calibration on an image acquisition device of the to-be-denoised image;

performing a preliminary filtering process on the to-be-denoised image to obtain a preliminary filtered image of the to-be-denoised image;

determining a noise level estimation result of the to-be-denoised image according to the target noise parameter and the preliminary filtered image; and performing a final denoising process on the to-be-denoised image according to the noise level estimation result to obtain a final blind denoising result of the to-be-denoised image;

wherein when executed by the processor, the computer program implements pre-performing the image noise calibration on the image acquisition device of the to-be-denoised image by:

determining at least one candidate exposure gain value according to a device attribute of the image acquisition device;

for each of the at least one candidate exposure gain value, acquiring data of at least two to-be-calibrated images from a same shooting scene through the image acquisition device, wherein at least one candidate exposure gain value is provided; and for each of the at least one candidate exposure gain value, determining a candidate noise parameter of a candidate exposure gain value according to the data of the at least two to-be-calibrated images associated with the candidate exposure gain value, and determining the image noise calibration result of the image acquisition device according to each of the at least one candidate exposure gain value and the candidate noise parameter associated with each of the at least one candidate exposure gain value;

wherein when executed by the processor, the computer program implements, for each of the at least one candidate exposure gain value, determining the candidate noise parameter of the candidate exposure gain value according to the data of the at least two to-be-calibrated images associated with the candidate exposure gain value by:

determining an image noise level expression of the image acquisition device as follows:

$$V(x) = \sum_{i=0}^{n} a_i x^i,$$

wherein x denotes a target pixel luminance value of a target pixel point, V(x) denotes a noise variance for characterizing a noise level of the target pixel point, n denotes a polynomial series, and $a_j$ is a to-be-calibrated noise parameter for characterizing a to-be-calibrated i-th order noise parameter under each of the at least one candidate exposure gain value, wherein n is a positive integer, n≥1, and 0≤i≤n;

determining an average calibrated image according to a pixel average value of the data of the at least two to-be-calibrated images associated with each of the at least one candidate exposure gain value on each pixel point;

determining a variance calibrated image according to a pixel value variance of the data of the at least two to-be-calibrated images associated with each of the at least one candidate exposure gain value on each pixel point; and determining at least (n+1) pairs of pixels with different values from the average calibrated image and the variance calibrated image, determining, according to the at least (n+1) pairs of pixels, a value of the to-be-calibrated noise parameter based on the image noise level expression, and using the value of the to-be-calibrated noise parameter as the candidate noise parameter for each of the at least one candidate exposure gain value.

8. The electronic device according to claim 6, wherein the image noise calibration result comprises at least one candidate exposure gain value and a candidate noise parameter associated with each of the at least one candidate exposure gain value; and the at least one processor is caused to implement determining the target noise parameter of the to-be-denoised image according to the image noise calibration result obtained by pre-performing the image noise calibration on the image acquisition device of the to-be-denoised image by:

determining a target exposure gain value of the image acquisition device when the image acquisition device acquires the to-be-denoised image; and determining, based on a relationship between the target exposure gain value and the at least one candidate exposure gain value, the target noise parameter associated with the target exposure gain value according to the candidate noise parameter associated with each of the at least one candidate exposure gain value.

9. The electronic device according to claim 6, wherein the at least one processor is caused to implement determining the noise level estimation result of the to-be-denoised image according to the target noise parameter and the preliminary filtered image by:

determining an image noise level expression of the image acquisition device as follows:

$$V_p = \sum_{i=0}^{n} a_{x,i} x_p^i,$$

wherein $x_p$ denotes a pixel value of a target pixel point in the preliminary filtered image, $V_p$ denotes a noise level of a pixel point which is in the to-be-denoised image and is associated with the target pixel point in the preliminary filtered image, n denotes a polynomial series, and $a_{x,i}$ is the target noise parameter of the to-be-denoised image, wherein the preliminary filtered image has a same image size as the to-be-denoised image, n is a positive integer, n≥1, and 0≤i≤n, and determining, based on the image noise level expression, a noise level of each pixel point in the preliminary filtered image according to the target noise parameter and a pixel value of each pixel point in the preliminary filtered image to obtain a noise level map, and using the noise level map as the noise level estimation result of the to-be-denoised image.

10. The electronic device according to claim 9, wherein the at least one processor is caused to implement performing the final denoising process on the to-be-denoised image according to the noise level estimation result to obtain the final blind denoising result of the to-be-denoised image by:

stitching the noise level map with the to-be-denoised image in a channel dimension to obtain a merged image; and performing, based on a pre-trained image noise removal network, a denoising process on the merged image to obtain the final blind denoising result of the to-be-denoised image.

11. The electronic device according to claim 6, wherein the preliminary filtering process uses Gaussian filtering, mean filtering, median filtering, bilateral filtering or guided filtering.

12. The storage medium according to claim 7, wherein the image noise calibration result comprises at least one candidate exposure gain value and a candidate noise parameter associated with each of the at least one candidate exposure gain value; and when executed by the processor, the computer program implements determining the target noise parameter of the to-be-denoised image according to the image noise calibration result obtained by pre-performing the image noise calibration on the image acquisition device of the to-be-denoised image by:

determining a target exposure gain value of the image acquisition device when the image acquisition device acquires the to-be-denoised image; and determining, based on a relationship between the target exposure gain value and the at least one candidate exposure gain value, the target noise parameter associated with the target exposure gain value according to the candidate noise parameter associated with each of the at least one candidate exposure gain value.

13. The storage medium according to claim 7, wherein when executed by the processor, the computer program implements determining the noise level estimation result of the to-be-denoised image according to the target noise parameter and the preliminary filtered image by:

determining an image noise level expression of the image acquisition device as follows:

$$V_p = \sum_{i=0}^{n} a_{x,i} x_p^i,$$

wherein $x_p$ denotes a pixel value of a target pixel point in the preliminary filtered image, $V_p$ denotes a noise level of a pixel point which is in the to-be-denoised image and is associated with the target pixel point in the preliminary filtered image, n denotes a polynomial series, and $a_{x,i}$ is the target noise parameter of the to-be-denoised image, wherein the preliminary filtered image has a same image size as the to-be-denoised image, n is a positive integer, $n \geq 1$, and $0 \leq i \leq n$; and determining, based on the image noise level expression, a noise level of each pixel point in the preliminary filtered image according to the target noise parameter and a pixel value of each pixel point in the preliminary filtered image to obtain a noise level map, and using the noise level map as the noise level estimation result of the to-be-denoised image.

14. The storage medium according to claim 13, wherein when executed by the processor, the computer program implements performing the final denoising process on the to-be-denoised image according to the noise level estimation result to obtain the final blind denoising result of the to-be-denoised image by:

stitching the noise level map with the to-be-denoised image in a channel dimension to obtain a merged image; and performing, based on a pre-trained image noise removal network, a denoising process on the merged image to obtain the final blind denoising result of the to-be-denoised image.

15. The storage medium according to claim 7, wherein the preliminary filtering process uses Gaussian filtering, mean filtering, median filtering, bilateral filtering or guided filtering.

* * * * *